United States Patent [19]

Holtz et al.

[11] 3,963,876
[45] June 15, 1976

[54] AMPLIFIER CIRCUIT FOR INCREASING TRANSMIT AND RECEIVE LEVELS IN A TELEPHONE HYBRID NETWORK

[75] Inventors: Roger Edward Holtz, Indianapolis; Roger Allen Radosevich, Noblesville, both of Ind.

[73] Assignee: Bell Telephone Laboratories, Incorporated, Murray Hill, N.J.

[22] Filed: June 30, 1975

[21] Appl. No.: 591,956

[52] U.S. Cl. ............................ 179/81 B; 179/81 A; 179/1 HF
[51] Int. Cl.² ................... H04M 1/60; H04M 1/58
[58] Field of Search ............. 179/81 A, 81 B, 81 R, 179/1 HF, 1 VL, 1 VC, 170.2, 170.8, 170 NC

[56] References Cited
UNITED STATES PATENTS

| | | |
|---|---|---|
| 3,602,648 | 8/1971 | Holtz ............................... 179/81 A |
| 3,751,602 | 8/1973 | Breeden ........................... 179/81 B |
| 3,823,273 | 7/1974 | Beeman ............................ 179/81 B |
| 3,889,059 | 6/1975 | Thompson ......................... 179/81 B |
| 3,899,643 | 8/1975 | Tabalba ............................ 179/81 B |

*Primary Examiner*—Kathleen H. Claffy
*Assistant Examiner*—Joseph Popek
*Attorney, Agent, or Firm*—H. L. Newman; J. A. Crawford

[57] ABSTRACT

A telephone amplifier circuit comprising a transmit amplifier and a receive amplifier provides gain in both the transmit and the receive directions. Loss is voice-switched into the receive amplifier in response to the sum of the transmit and receive speech levels to provide sidetone and gain control.

18 Claims, 3 Drawing Figures

AMPLIFIER CIRCUIT FOR INCREASING TRANSMIT AND RECEIVE LEVELS IN A TELEPHONE HYBRID NETWORK

BACKGROUND OF THE INVENTION

1. Field of the Invention

This invention relates generally to voice-switched telephone amplifier circuits of the type especially used in repeaters, speakerphones, and handicap-type amplifiers, and more specifically, to the type of amplifier which is adapted to be disposed entirely within a telephone station set or handset.

2. Description of the Prior Art

Telephone subscribers many miles from the central office require special equipment to compensate for the poorer transmission performance caused by the inherent losses in the telephone line. The conventional approach has been to provide increased gain in the central office. The amount of gain that can be added at the central office is limited by cross-talk considerations. Loss in some loops cannot be compensated for by gain devices located in the central office. A different approach has been to add auxiliary repeaters to the line at locations remote from the central office which compensate for the attenuation of the telephone signals along the telephone line. If only a few subscribers are to be connected in an area the added cost of a series of auxiliary repeaters is generally high.

The amplifier circuit in accordance with the present invention utilizes a more practical approach, i.e., extra amplification is provided at the subscribers station rather than at an exposed location out in the loop. Not only has this approach proven to be substantially less expensive initially, but maintenance expenses are lower, and the equipment is within the protected environment of the subscriber's house.

In addition to compensating for the electrical losses in the telephone line, another reason for providing extra amplification at the telephone set is to compensate for a weak acoustic signal applied to the telephone set. For example, compensation must be provided when using a speakerphone, or similarly, when an individual subscriber has hearing or speech disabilities.

Examples of prior art auxiliary amplifiers adapted to be located at the subscriber station, and more particularly within the telephone handset, are shown by U.S. Pat. No. 2,842,623, issued to Philip N. Lehr on July 8, 1958 and U.S. Pat. No. 3,254,160, issued to P. B. Day and J. Radomski on May 31, 1966. These patents show supplemental handicap-type amplifiers which are adapted to be disposed within the telephone handset and which supply increased gain to the receive signal or to both the transmit and the receive signals.

The problem with merely adding transmit and receive gain in the telephone set is that it causes the sidetone signal which is heard in the receiver to increase by the sum of the transmit and receive gains. If the sidetone signal increases to an objectionable level, it becomes annoying to the user; moreover, there is a tendency for the user to lower his voice, thus defeating the purpose of the additional auxiliary amplification.

Voice-switching is one possible solution. Voice-switching loss (or gain) to provide sidetone control or automatic gain control is shown in the telephone amplifier art by U.S. Pat. No. 3,602,648, issued to R.E. Holtz and J.A. Markevich on Aug. 31, 1971 and U.S. Pat. No. 3,823,273, issued to R.H. Beeman and R.T. Cleary on July 9, 1974. These particular patents are examples of voice-switched telephone amplifier circuits which compensate for the inherent loop losses in the line to a distant location. The prior art, however, has not disclosed a stable line-powered telephone amplifier circuit which can operate with a conventional hybrid network on loop currents as low as 3 milliamperes to provide telephone sets with additional transmit and receive gain while automatically maintaining sidetone in the normal range and reducing excessively high receive levels.

SUMMARY OF THE INVENTION

In accordance with the present invention, a telephone amplifier circuit of the type including a microphone and a transmit amplifier, a receiver and a receive amplifier is provided. The transmit and receive amplifiers provide extra amplification above that of a conventional telephone set. The amplifying circuitry for supplying boost amplification is powered from the transmit port of a conventional telephone hybrid speech network and is capable of being disposed entirely within the telephone base or the telephone handset. The amplifier circuitry comprises a transmit amplifier located between the microphone and the hybrid network transmit port, and a receive amplifier located between the hybrid network receive port and the receiver. The transmit amplifier is powered from the power available at the transmit port. The receive amplifier is powered from the power available at the transmit port. Voice-switching means coupled to the transmit signal path and to the receive signal path supplies voice-switched loss to the receive amplifier in response to the sum of the speech signals at the transmit and receive ports of the hybrid network. The voice-switching of loss at the receive amplifier provides sidetone control as well as gain control to reduce high receive levels. The microphone-amplifier and the receiver-amplifier combinations provide stable amplification with telephone set currents as low as 3 milliamperes.

DETAILED DESCRIPTION

The amplifier circuitry in accordance with the present invention as shown in the block diagrams of FIGS. 1–3 consists of three basic elements: a transmit amplifier and microphone circuit 1 (hereinafter "transmit amplifier circuit"), a receive amplifier and receiver circuit 2 (hereinafter "receive amplifier circuit") and a threshold detector and receive gain control circuit 3 (hereinafter "threshold detector circuit"). The amplifier circuitry connects to the transmit port C-D and to the receive port A-B of a conventional hybrid network 4.

Figure 1:
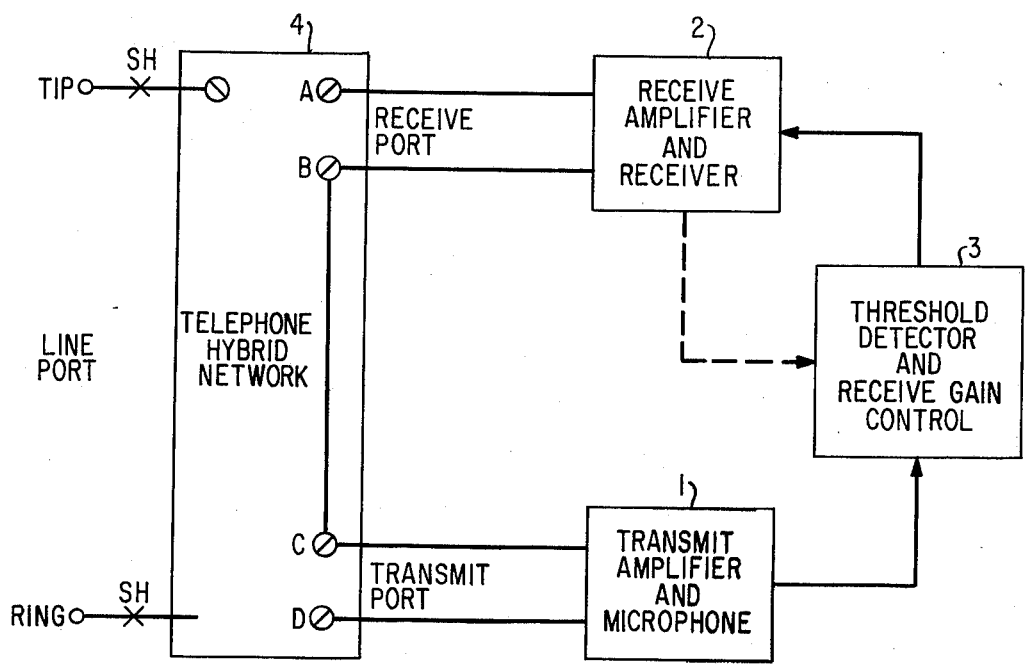
FIG. 1 is a block diagram of a telephone amplifier circuit in accordance with the present invention.

The hybrid network 4 as shown in FIG. 1 is preferably a conventional "common-point hybrid" (i.e., the receive port A-B and the transmit port C-D have a common terminal (B-C) which is electrically tied together so that the siganl appearing between terminals A-D is the sum of the transmit signal appearing at the transmit port C-D and the receive signal appearing at the receive port A-B. During receiving, a portion of the receive signal appears at the transmit port C-D of this type of hybrid and is in phase with the receive signal at the receive port A-B. If a different type of hybrid is desired and should the receive signals be out-of-phase, it should be readily apparent to one skilled in the art to modify the hybrid network (e.g., by inserting a transformer or a phase-shifter such as inverter) to provide a common point or the correct signal relationships. The details of the hybrid network 4, other than the above-mentioned aspects, are not a part of the present invention; accordingly, elaboration of the block diagram of the hybrid network 4 is unnecessary.

Figure 2:
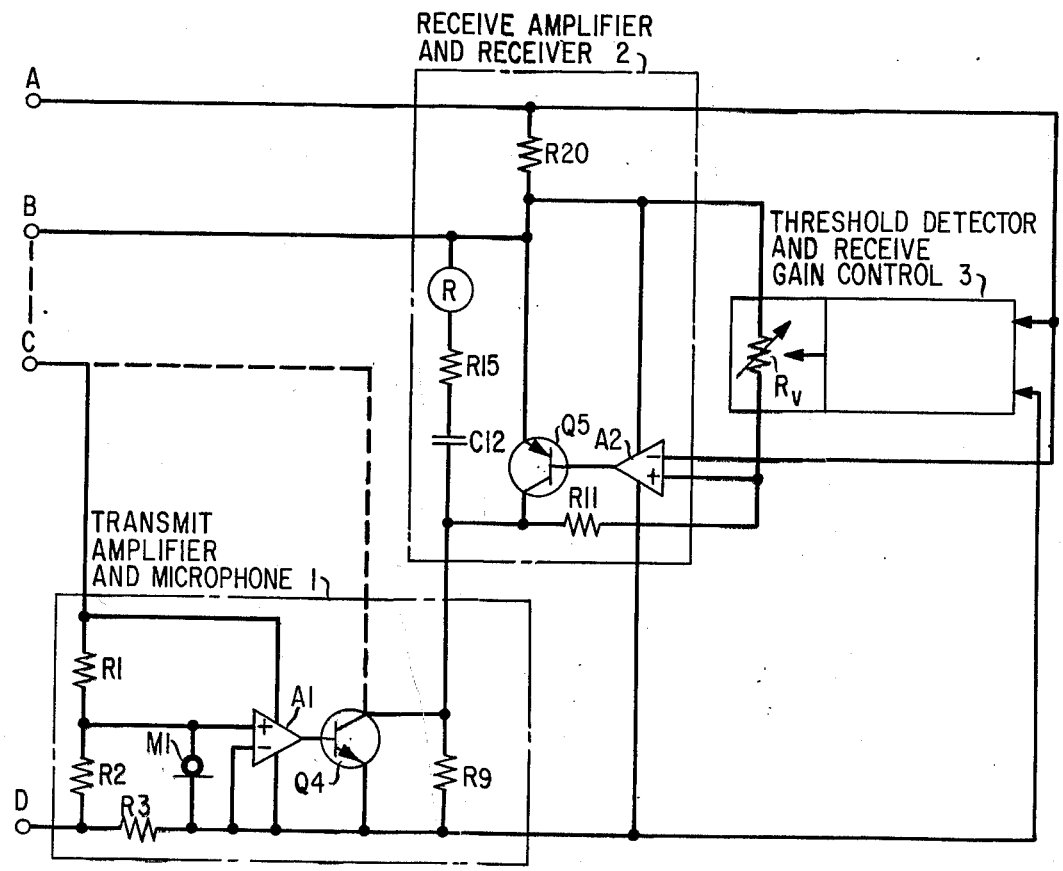
FIG. 2 is a circuit schematic showing the details of the receive amplifier and receiver block 2 and of the transmit amplifier and microphone block 1 of the diagram shown in FIG. 1.

Referring now to FIG. 2, the amplifier circuitry in accordance with the present invention comprises a transmit amplifier circuit 1 which includes a microphone M1 (preferably of the electromagnetic transducer type), a receive amplifier circuit 2 which includes a conventional telephone receiver R (e.g. electromagnetic type), and a threshold detector and receive gain control circuit 3.

The transmit amplifier circuit 1 comprises the microphone M1, an amplifier A1, an output transistor Q4, voltage feedback resistors R1, R2, current feedback resistor R3 and shunt resistor R9. The operation of the transmit amplifier circuit 1 is best visualized by first assuming a short circuit across the output of the receive amplifier circuit 2 (the dotted line shown). The assumption of a short there is reasonable, since the output impedance of the receive amplifier circuit 2 is relatively small compared to the output impedance of the output transistor Q4, and shunt resistor R9. Microphone M1 connects to the input of amplifier A1. Amplifier A1 and output transistor Q4 provide sufficient gain to raise the output level from the microphone M1 to the level required at the transmit port C-D of the telephone hybrid network 4. Voltage feedback from the voltage divider combination of the resistors R1 and R2, and current feedback from the resistor R3 control the gain from the microphone M1 to the transmit port C-D as well as the output impedance of the transmit amplifier circuit 1.

Amplifier A1 is powered across the transmit port C-D by connecting one of its power supply leads to terminal C and the other to terminal D through resistor R3. Since AC and DC signals are both present at the transmit port C-D and since the transmit amplifier A1 derives its power from the transmit port C-D through resistor R3, it is desirable that amplifier A1 be of the type that it is insensitive to AC signals on its power supply. The feedback from resistor R3 automatically compensates for shunt currents around transistor Q4 (i.e., the power supply current for amplifier A1) so that such currents do not affect the AC signal or output impedance of the transmit amplifier circuit 1. Shunt resistor R9 provides a shunt current path around output transistor Q4.

The receive amplifier circuit 2 comprises an amplifier A2, feedback resistor R11, an output transistor Q5, terminating resistor R20, coupling capacitor C12, and output resistor R15. A variable resistance Rv (located in the threshold detector circuit 3) controls the gain of the receive amplifier A2.

The receive signal from the receive port A-B of the hybrid network 4 is applied across terminating resistor R20 and to the input of the amplifier A2. The terminating resistor R20 is chosen to approximate the impedance of a conventional telephone receiver which would otherwise be connected across the receive port A-B of the hybrid network 4. Thus, the intended anti-sidetone operation of the hybrid network 4 is maintained.

The power supply leads of amplifier A2 are connected across terminals C and D through terminating resistor R20 and resistor R3. Thus, the receive amplifier A2 uses power from the transmit port C-D and it is desirable that amplifier A2 also be insensitive to AC signals on its power supply. The non-inverting input of amplifier A2 is connected to the midpoint of a voltage divider consisting of feedback resistor R11 and the variable resistance Rv. The output of amplifier A2 is applied to the base of the output transistor Q5. The output from the collector of the output transistor Q5 drives the receiver R. The receiver R is coupled to the collector of the output transistor Q5 by output resistor R15 and coupling capacitor C12. Sufficient feedback is provided by the voltage divider consisting of feedback resistor R11 and the variable resistor Rv to control the output impedance and gain of the amplifier A2. The output impedance, from the collector to the emitter of output transistor Q5, is intentionally made low (e.g., <5Ω) to prevent any currents generated in the output transistor Q4 of the transmit amplifier circuit 1 from coupling into the receiver R. The low output impedance of the receive amplifier circuit 2 allows output transistor Q5 to be connected in series with output transistor Q4.

The transmit amplifier circuit 1 and receive amplifier circuit 2 have each been realized by connection of an amplifier (A1, A2) to an output transistor (Q4, Q5). The amplifiers require the highest voltage and are therefore connected in parallel across the transmit port C-D. The output transistors require most of the transmit port current and not as much voltage as the amplifiers and are therefore connected in series across the transmit port C-D. This method of connection of transmit amplifier circuit 1 and receive amplifier circuit 2 allows the circuits to be powered on the small amount of available power from the transmit port C-D in an efficient manner, the two amplifier circuits operating on very little more power than either would require alone.

The threshold detector and receive gain control circuit is connected between terminal A and through resistor R3 to terminal D. This connection allows the threshold detector circuit 3 to respond to the AC signal between terminal A and terminal D, which is effectively (since the resistance of resistor R3 is relatively small) the sum of the transmit and the receive signals. Due to the nature of the hybrid network 4 during transmitting, the voltage at the receive port A-B is relatively small compared to the voltage at the transmit port C-D; thus the voltage from terminal A to terminal D which is present at the input of the threshold detector 3 is approximately the voltage of the transmit port C-D. During receiving, the voltage at the transmit port C-D is nearly the same as the voltage at the receive port A-B. Accordingly, during receiving, the voltage between terminal A and terminal D which is present at the input of the threshold 3 is nearly twice the voltage of the receive port A-B. In either case (transmitting or receiving), when the AC signal voltage between terminal A and terminal D exceeds the specified threshold level of the threshold detector 3, attenuation (resistance Rv) is switched into the receive amplifier A2 by the threshold detector circuit 3. This action lowers high sidetone levels when transmitting and lowers high receive levels when receiving.

Figure 3:
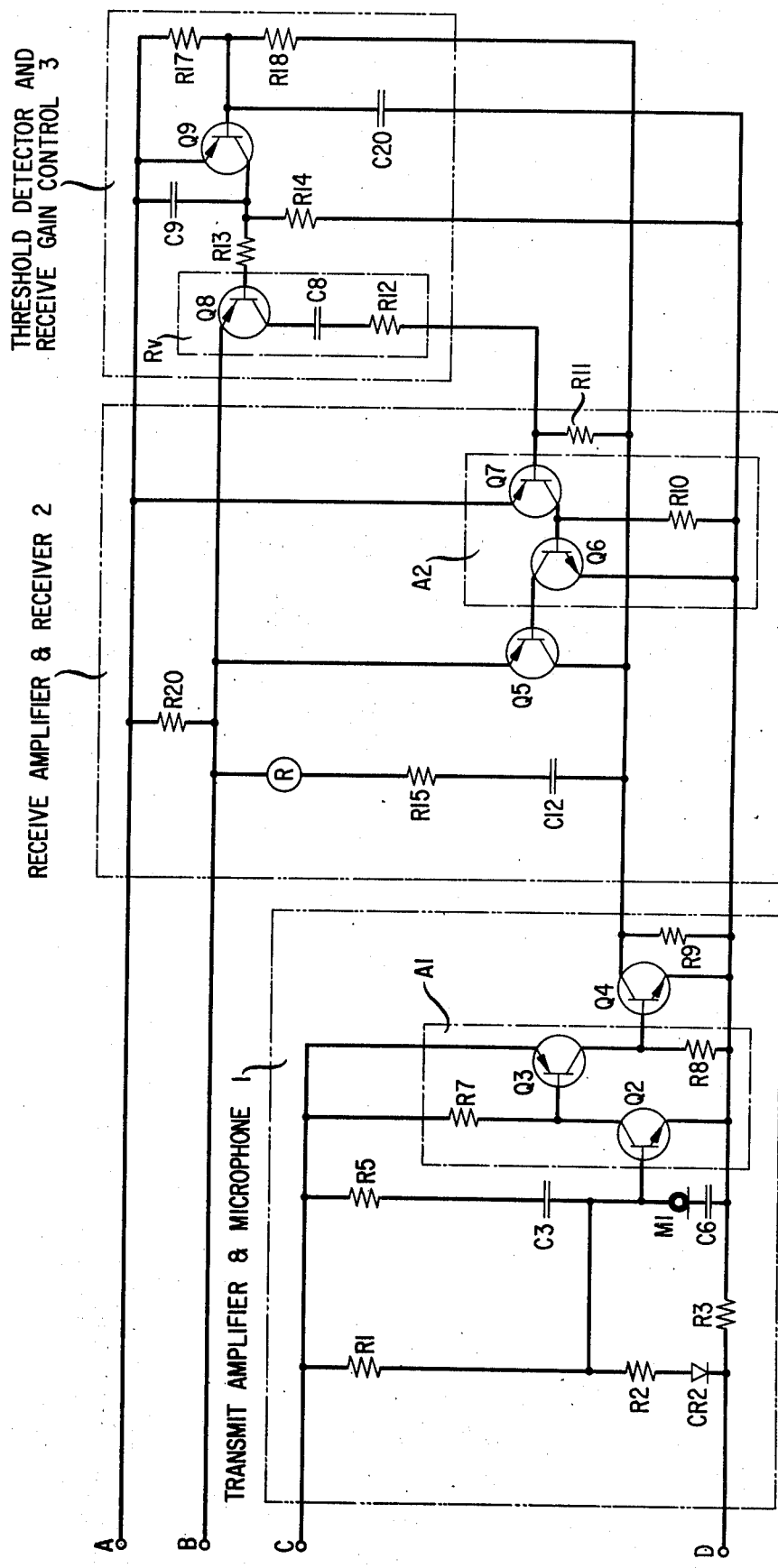
FIG. 3 is a circuit schematic showing the details of a preferred embodiment of the transmit and receive amplifiers A1, A2, shown in FIG. 2 and of the threshold detector and gain control circuit block 3 shown in FIGS. 1 and 2.

The details of a preferred embodiment of the amplifier circuitry in accordance with the present invention are shown in FIG. 3.

The transmit amplifier circuit 1 of FIG. 3 comprises the amplifier A1, the feedback voltage divider resistors R1 and R2, the current feedback resistance R3, the dynamic microphone M1, the output transistor Q4 and the shunt resistor R9 as shown in FIG. 2 and discussed previously. Capacitor C3 and resistor R5 provide frequency shaping for the gain of the transmit amplifier circuit 1. A preferred realization of the amplifier A1 of FIG. 2 comprises the two stage direct coupled complementary biased transistors Q2, Q3 and output resistances R7 and R8.

The diode CR2 shifts the DC level of the voltage divider ratio of the feedback resistors R1, R2. Resistors R1, R2, R3, R7, and R8 are selected so that most of the current flows through output transistor Q4. The shunt resistor R9 serves to bypass a small amount of current around output transistor Q4. The dynamic microphone M1 is coupled to the transmit amplifier A1 by the coupling capacitor C6. The amplifier A1 is relatively insensitive to AC signals at the transmit port C-D of the hybrid network 4 on its power supply since AC signals will not generate any base current in the transistor Q3 and will be blocked. This amplifier will function, for the purposes of this application, down to approximately 0.8 volts (DC minus peak AC) and less than 200 microamperes. The output transistor Q4 will operate down to approximately 0.2 volts. Thus 0.6 volts is available to power the output transistor Q5 of the receive amplifier circuit 1.

The receive amplifier circuit 2 comprises the amplifier A2, the output transistor Q5, the feedback resistor R11, the coupling capacitor C12, the output resistor R15, the receiver R, and the terminating resistor R20 as previously described in connection with FIG. 2. Amplifier A2 is realized by two-stage direct coupled complementary biased transistors Q6, Q7 and resistor R10. Like amplifier A1, amplifier A2 is relatively insensitive to AC signals at the transmit port C-D on its power supply because of the blocking action of transistor Q6. Likewise, amplifier A2 can operate down to 0.8 volts and less than 200 microamperes. Input transistor Q7 and feedback resistor R11 set the DC bias of transistor Q4 at 0.6 volts. Resistors R10 and R11 are selected so that most of the receive amplifier current flows through transistor Q5. Transistor Q5 is biased from the 0.6 volts that was unavailable to the transmit amplifier output transistor Q4 and most of the current flows through the output transistors Q4 and Q5. The receive amplifier output transistor Q5 can be placed in series with the transmit amplifier output transistor Q4. The shunt resistor R9 insures that slightly more current flows through output transistor Q5 than through output transistor Q4. This protects the receiver R from high level transmit signals by cutting off output transistor Q4 before cutting off output transistor Q5, thus limiting the current into the transmit port C-D.

The threshold detector and receive gain control circuit 3 comprises transistors Q8, Q9, resistors R12, R13, R14, R17, R18 and capacitors C8, C20, C9. The variable resistance Rv (FIG. 2) comprises the impedances of resistor R12, DC blocking capacitor C8 and attenuating transistor Q8. The resistors R17 and R18 form a voltage divider which provides the proper threshold adjustment for voice-switching transistor Q9. The voltage divider for the threshold adjustment is effectively connected across the output transistor Q5, since the DC voltage across the receive port A-B is very small and biases transistor Q9 in cut off.

Transistor Q9 is the voice-switching means whose function is to vary the base current of attenuating transistor Q8. The threshold level is set by the voltage divider resistors R17, R18. Since the collector of the transistor Q8 is capacitively coupled to the circuit by capacitor C8, the transistor Q8 functions as an AC switch only. Capacitor C20 is connected to terminal D through resistor R3 and the emitter of Q9 is connected to terminal A. In effect, the AC signal present at the base of transistor Q9 is the sum of the transmit port and the receive port signals. Transistor Q9 is biased in cut-off and it turns on when the peak AC signal plus bias reaches the required threshold level. When transistor Q9 is off, transistor Q8 is maintained in a low impedance state by the base current through resistors R13 and R14. Capacitor C9 is then charged up to about half the voltage of the transmit port C-D. When transistor Q9 turns on, capacitor C9 discharges. Whenever the voltage across capacitor C9 gets to be less than the turn-on voltage of attenuating transistor Q8, transistor Q8 becomes a high resistance, and decreases the gain of the amplifier A2. When transistor Q9 turns off, the base current in transistor Q8 remains low until the capacitor C9 charges up again to the turn-on voltage, thus providing holdover timing. The time constant is determined by the RC combination of resistor R14 and capacitor C9, which may be adjusted to provide a sufficient holdover time. Thus, the RC timing combination delays the return of transistor Q8 to a low resistance state after it has been switched to a high resistance state.

Although but one embodiment of the invention has been shown and described, it will be understood that it is only illustrative and that various modifications may be made therein without departing from the scope and spirit of this invention as defined in the appended claims.

What is claimed is:

1. Amplifier circuitry for a telephone hybrid network comprising a speech transmit port and a speech receive port having a common terminal with said transmit port, the improvement characterized in that said amplifier circuitry comprises a first amplifier means connected to said transmit port, a second amplifier means connected to said receive port, attenuating means connected to said second amplifier means for attenuating the gain of said second amplifier means, and voice-switching means adapted to supply a control signal to said attentuating means in response to the sum of the amplitude of the speech signals at said receive port and at said transmit port whereby the amplification of the speech signals by said second amplifier is attenuated for providing sidetone control and gain control.

2. Amplifier circuitry as in claim 1 wherein said voice-switching means is coupled to said transmit port, to said receive port, and to said attenuating means.

3. Amplifier circuitry as in claim 1 wherein said voice-switching means supplies a control signal to said attenuating means when said sum exceeds a predetermined threshold level.

4. Amplifier circuitry as in claim 1 wherein said voice-switching means includes a transistor biased between its conducting and non-conducting states in response to the sum of the transmit and receive speech levels exceeding a predetermined theshold level.

5. Amplifier circuitry as in claim 1 wherein said attenuating means includes a transistor varied from a low impedance state to a high impedance state in response to the sum of the transmit and receive speech levels exceeding a predetermined threshold level.

6. Amplifier circuitry as in claim 1 comprising a microphone connected to the input of said first amplifier means, a first output transistor connected to the output of said first amplifier means, a second output transistor connected across the output of said second amplifier means and connected in series with said first output transistor to said common terminal, and a receiver connected across the output of said second output transistor.

7. Amplifier circuitry for a telephone hybrid network comprising a speech transmit port and a speech receive port having a common terminal with said transmit port, the improvement characterized in that said amplifier circuitry comprises a first amplifier means connected to said transmit port, a second amplifier means connected to said receive port, DC power for said first and second amplifier means being derived from said transmit port, said first and second amplifier means being interconnected such that the total power required by both of said amplifier means is approximately the same as that required by either of said amplifier means operating alone.

8. Amplifier circuitry as in claim 7 wherein said first and second amplifier means each include an amplifier having the ability to reject AC signals present at said transmit port.

9. Amplifier circuitry as in claim 8 wherein said amplifier each comprise a pair of complementary transistors.

10. Amplifier circuitry as in claim 8 wherein said amplifiers are connected in parallel across said transmit port.

11. Amplifier circuitry as in claim 7 wherein said first and second amplifier means each include an output stage, said output stages being connected in series across said transmit port.

12. Amplifier circuitry as in claim 7 wherein each of said first and second amplifier means comprises an amplifier coupled to an output stage, said amplifier requiring a higher voltage than said output stage and said output stage requiring a higher current than said amplifier.

13. Amplifier circuitry as in claim 12 wherein said amplifiers are connected in parallel across said transmit port and said output stage are connected in series across said transmit port.

14. Amplifier circuitry as in claim 13 wherein said amplifiers each have the ability to reject AC signals present at said transmit port.

15. Amplifier circuitry as in claim 14 wherein said amplifiers each comprise a pair of complementary transistors direct coupled.

16. Amplifier circuitry as in claim 15 wherein said output stages each comprise a transistor direct coupled to the output of the associated amplifier.

17. Amplifier circuitry as in claim 13 wherein each of said amplifiers has a high DC impedance whereby most of the current available at said transmit port flows through said series connected output stages.

18. Amplifier circuitry as in claim 17 further including a microphone coupled to an input of said first amplifier means, said output stage thereof being coupled to said transmit port, and a receiver coupled to said output stage of said second amplifier means, an input of said second amplifier means being coupled to said receive port.

* * * * *